US007634424B2

(12) United States Patent
Steinman et al.

(10) Patent No.: US 7,634,424 B2
(45) Date of Patent: Dec. 15, 2009

(54) NETWORK-BASED SWEEPSTAKES SYSTEMS AND METHOD

(75) Inventors: Jonas Lowell Steinman, Englewood Cliffs, NJ (US); Frank William Daugherty, Old Greenwich, CT (US); Darrel E Herbst, Hoboken, NJ (US); Lukas C Oberhuber, San Francisco, CA (US)

(73) Assignee: Mindspark Interactive Network, Inc., New York, NY (US)

( * ) Notice: Subject to any disclaimer, the term of this patent is extended or adjusted under 35 U.S.C. 154(b) by 771 days.

(21) Appl. No.: 09/412,013

(22) Filed: Oct. 4, 1999

(65) Prior Publication Data

US 2003/0105663 A1     Jun. 5, 2003

(51) Int. Cl.
*G06Q 30/00* (2006.01)
(52) U.S. Cl. .............................. 705/14; 705/1; 705/10; 463/1; 463/16
(58) Field of Classification Search ..................... 705/1, 705/14, 10; 463/1, 16
See application file for complete search history.

(56) References Cited

U.S. PATENT DOCUMENTS

| 5,025,372 | A | 6/1991 | Burton et al. | 364/406 |
| 5,056,019 | A | 10/1991 | Schultz et al. | 364/405 |
| 5,774,870 | A | 6/1998 | Storey | 705/14 |
| 5,907,831 | A | 5/1999 | Lotvin et al. | 705/14 |
| 5,915,244 | A | 6/1999 | Jack et al. | 705/14 |
| 5,933,811 | A | 8/1999 | Angles et al. | 705/14 |
| 5,937,391 | A | 8/1999 | Ikeda et al. | 705/14 |
| 6,061,660 | A * | 5/2000 | Eggleston et al. | 705/14 |
| 6,799,176 | B1 * | 9/2004 | Page | 707/5 |

OTHER PUBLICATIONS

Diaolog reference, file 15 #01794340, Marc Gunther, "The trouble with web advertising" Fortune V139n7 pp. 147-148, Apr. 12, 1999.*
Pages from ClickRewards.com website, copyright 1998, 1999 [retrieved on Sep. 21, 1999]; retrieved from the Internet <URL:clickrewards.com>.
Pages from Cybergold.com website [retrieved on Sep. 23, 1999]; retrieved from the Internet <URL:.cybergold.com>.
Pages from FreeLotto.com website, copyright 1999 [retrieved on Sep. 21, 1999]; retrieved from the Internet <URL:freelotto.com>.

(Continued)

*Primary Examiner*—Raquel Alvarez
(74) *Attorney, Agent, or Firm*—Stephen M. De Klerk; Sonnenschein, Nath & Rosenthal LLP

(57) ABSTRACT

A system and method for automatically enrolling users of a website or other network-based service in sweepstakes. A user of a user computer system connects to a host computer system hosting a website or other network-based service and is awarded points for accessing features of the website or service. The points are displayed in real-time on the user's computer and transmitted to a database server, which maintains the user's point totals. The user is then automatically given a number of entries in a sweepstakes based on the number of points he or she has been awarded. Users may also be awarded points for accessing features of websites or services of third-party host computer systems.

61 Claims, 4 Drawing Sheets

OTHER PUBLICATIONS

Pages from Freeride.com website, copyright 1995-1999 [retrieved on Sep. 21, 1999]; retrieved from the Internet <URL:freeride.com>.

Pages from Go Network website, copyright 1998, 1999 [retrieved on Sep. 21, 1999]; retrieved from the Internet <URL:http://games.go.com>.

Pages from GoToWorld.com website, copyright 1999 [retrieved on Sep. 23, 1999]; retrieved from the Internet <URL:gotoworld.com>.

Pages from MyPoints.com website, copyright 1997-1999 [retrieved on Sep. 21, 1999]; retrieved from the Internet <URL:mypoints.com and www.mypointsinc.com>.

Pages from Netcentives.com website, copyright 1997-1999 [retrieved on Sep. 21, 1999]; retrieved from the Internet <URL:netcentives.com>.

Pages from PrizePoint.com website, copyright 1998-1999 [retrieved on Sep. 21, 1999]; retrieved from the Internet <URL:prizepoint.com>.

Pages from Sweepstakes Advantage website, copyright 1998-1999 [retrieved on Sep. 21, 1999]; retrieved from the Internet <URL:sweepsadvantage.com>.

Pages from Sweepstakes Network website [retrieved on Sep. 21, 1999]; retrieved from the Internet <URL:Sweepstakesnetwork.com>.

Pages from Sweepstakes Online website, copyright 1994-1999 [retrieved on Sep. 21, 2000]; retrieved from the Internet <URL:sweepstakesonline.com>.

Pages from Uproar.com website, copyright 1996-1999 [retrieved on Sep. 21, 1999]; retrieved from the Internet <URL:uproar.com>.

Pages from Webstakes.com website, copyright 1996-1999 [retrieved on Sep. 21, 1999]; retrieved from the Internet <URL:webstakes.com>.

FL Sportline USA: "Sportline USA, Inc. Reports Fourth Quarter Financial Results," Business Editors, Jan. 28, 1999.

"Is the Internet a New Key to Retailing Success?," Jewelers' Circular-Keystone, Sep. 1998.

Article entitled "CBS Sportsline Launches Innovative "Sportsline Rewards" Relationship Program", download from httn://about.sportsline.com/releases/rewards.htm on Jun. 17, 2003. 2pgs.

Arman, Danesh, "Teach Yourself JavaScript in a Week, Chapter 9: Remember where you've been with cookies", Innternet, 1996, XP002299088, Section 9 until "Listing 9.1".

Netscape Communications Corporations: "Additional Topics", Client-Side Javascript Guide, Jun. 1999, pp. 201-210, XP002222837, Section "Using Cookies with Javascrpt".

U.S. Department of Energy Computer Incident Advisory Capability: "What Are Cookies?", Internet, Mar. 12, 1998, XP002145971 cookies.

* cited by examiner

NETWORK-BASED SWEEPSTAKES SYSTEMS AND METHOD

FIELD OF THE INVENTION

The present invention relates to a system and method for generating traffic at Internet websites or other network-based services accessible for on-line communications and, in particular, for encouraging users to use a website or other network-based service by automatically enrolling users in sweepstakes.

BACKGROUND OF THE INVENTION

With the proliferation of Internet websites, a major problem for website providers is attracting and retaining Internet users. This problem is of critical importance because advertising revenues, which is the major source of revenue for many websites, is often linked to the number of users visiting a site and the amount of time users spend on a site.

One technique used to attract users is to award points for, for example, purchasing goods through a website, which may be redeemed for merchandise or other prizes. Such a technique is described in U.S. Pat. No. 5,774,870 to Storey. One drawback of this technique is that it is generally applicable only to websites where goods are sold and requires that the website provider have some manner of goods or services to be exchanged for points. Another drawback is that many Internet users are reluctant to make purchases over the Internet and therefore an award program based on purchases will not attract these users. Still another drawback of this technique is that it requires Internet users to actively redeem accumulated points, which some users may find bothersome. Another drawback is that it requires the Internet provider to provide and support a points redemption program.

SUMMARY OF THE INVENTION

It is therefore an object of the present invention to provide a system and method for attracting and retaining Internet users, and users of other network-based services, by rewarding users for accessing and using a website, or other feature of a network-based service, but without the drawbacks characteristic of the prior art, as mentioned above.

It is another object of the invention to provide a system and method for operating an on-line sweepstakes.

Briefly, the present invention provides a system and method in which users are awarded points, referred to herein as "bones," for accessing a website, and, in particular, for clicking on hyperlinks within the website. The number of bones awarded for clicking on each hyperlink is stored in a table on the web servers in the host system hosting the website. A tally of the number of bones awarded to each user over various periods of time is stored in a database on a database server. Illustratively, these periods are daily, monthly and yearly. These tallies are used to automatically enter each user in daily, monthly and yearly sweepstakes, awarding substantial cash or other prizes. Users are given an entry in each sweepstakes for each corresponding bone and, thus, the more bones that a user accumulates the more likely he or she is to win any of the sweepstakes.

When a user signs in to the website, the bone information for that user is retrieved by the web server from the database and stored in cookies on the user's PC. A box is then displayed on the user's PC stating the user's current number of daily, monthly and yearly bones. The web server updates the display in real-time as the user accumulates more bones. In addition, the web server sends real-time user bone information to the database server so that the database server can maintain user bone information independently of the information stored in the cookies on the user's PC. In a preferred embodiment, the database server periodically transmits (for example, once a day) user bone information to a sweepstakes system that conducts the sweepstakes.

The present invention thus encourages users to access and use a website by awarding bones that give users chances to win sweepstakes. Users are automatically enrolled in the sweepstakes and thus are required to take no action other than using the website. The invention can be used on any type of website and does not require that the website sell a product. It also does not require that the website host provide products or services as prizes or provide and maintain a point redemption program.

DETAILED DESCRIPTION

Figure 1:
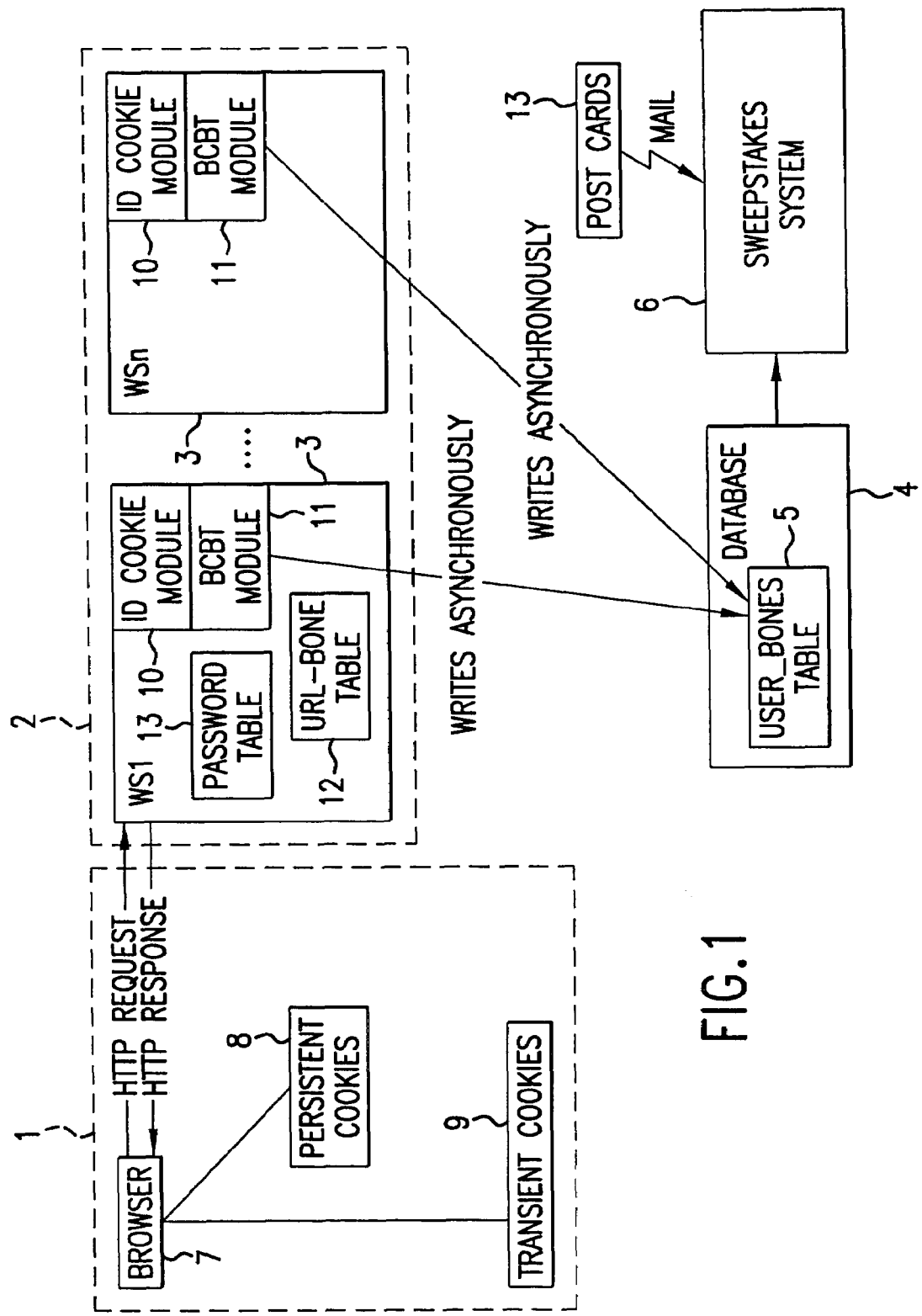
FIG. 1 is a block diagram of an Internet-based sweepstakes system of a preferred embodiment of the present invention.

FIG. 1 illustrates the basic hardware setup of a preferred embodiment of the present invention. A user at personal computer (PC) 1 connects, preferably via the Internet, to host 2. PC 1 contains a processor, such as Pentium II, and memory. Host 2 is comprised of one or more web servers 3, such as Netscape Enterprise Webservers. The web servers 3 are in turn connected to database server 4, containing database 5. Database server 4 is connected, via a dial-up connection, local or wide area network, or other means, to sweepstakes system 6.

Briefly, PC 1 contains and executes browser 7, which enables PC 1 to communicate with a web server 3, and contains various persistent and transient cookies 8 and 9. Cookies 8 and 9 are set by web server 3; persistent cookies 8 are typically set when a user registers with host 2 and transient cookies are typically set when the user subsequently accesses host 2. Browser 7 and cookies 8 and 9 reside in memory in PC 1. In a preferred embodiment, host 2 hosts a portal-type website, i.e., a website that provides hyperlinks to various services, various webpages in the website and various other websites and services. When PC 1 connects to a web server 3, it downloads a webpage, which is displayed by browser 7. The webpage contains hyperlinks that are typically highlighted in some manner by browser 7. When a user selects a hyperlink, by for example clicking on it with his or her mouse, PC 1 sends a URL (uniform resource locator) corresponding to the hyperlink to webserver 3.

In accordance with the present invention, a user is awarded points, referred to herein as "bones," for clicking on hyperlinks. The hyperlinks may represent, in the user's view, a request for a webpage or a portion of a webpage or a request for a service or other feature of a website. For example, a user may be awarded bones for performing some task, such as making a webpage on host 2 the user's homepage or signing up for a service, such as email. In this case, the user may have to click on one or more hyperlinks to complete the task, with the last hyperlink, for example, indicating that the task has been completed. Alternatively, after the user has completed the task, host 2 can send a redirection response to PC 1, causing PC 1 to automatically request a url associated with the completion of the task. Advantageously, different numbers of bones may be awarded for clicking on different hyperlinks in accordance with a URL-Bone Table 12. Users are automatically enrolled in daily, monthly and yearly sweepstakes and their chances of winning depend on the number of bones they have collected over the corresponding time period. For security and sometimes legal reasons, the maximum number of bones a user can accumulate in a day is fixed. In one embodiment, the maximum number is 100. Transient cookies 9 on PC 1 store the daily, monthly and yearly bone totals. A javascript on PC 1 displays a "bone box" on PC 1, containing the user's first name and daily, monthy and yearly bone totals as stored in cookies 9.

Each webserver 3 executes ID cookie module 10 and BCBT (bone counting bone tracking) module 11. ID cookie module 10 generates a unique user ID when a user registers and writes the ID in a persistent cookie, called ssuid, on PC 1. The unique user ID can be generated, for example, using Vignette Corporation's StoryServer Software package, which guarantees that the ID is specific and unique for each user and produces IDs that are very difficult to generate without using the package (i.e., the IDs are difficult to "spoof"). ID cookie module 10 also generates a unique user number, associated with each unique user ID, and writes the user number in a persistent cookie, called user_num, on PC 1. The user_num cookie is used as an index to conveniently access URL-Bone Table 12.

BCBT module 11 performs the following functions:

(a) determines whether the user interacting with the host system is a registered user and sets the Register_flag cookie on PC 1 to 'Y' (yes) or 'N' (no) accordingly, causing the javascript on PC 1 to display a message directing the user to register if he or she is not a registered user;

(b) awards a number of bones to a user for requesting a hyperlink, or url, based on the number specified in URL-Bone Table 12;

(c) awards bones to bone counter cookies on the user's PC and asynchronously or synchronously writes the number of awarded bones to Database Server 4 (Database Server 4 in turn updates user-bones table 5, which stores daily, monthly and yearly bone information for one or more of the registered users).

(d) if the daily bone limit for a user has been reached, does not increment the bone counter cookies or send awarded bone information for the user to the database;

(e) writes the user's first name, and daily, monthly and yearly bone totals to temporary cookies, called Firstname, Bonecounter_daily, Bonecounter_monthly and Bonecounter_yearly, respectively, which are then displayed in a "bone box" via a javascript that executes on PC 1;

(f) writes a special value into the Bonecounter_daily cookie when the system is unavailable because the Database Server 4 is transmitting bone information to Sweepstakes System 6 (called "bone time"), which in turn causes the javascript on PC 1 to display a message indicating that bones cannot be awarded at the present time; and (g) when an error occurs, writes an error code in an Errorcode cookie on PC 1, causing the javascript to display the appropriate error message.

The BCBT module may be implemented as an NSAPI (Netscape Application Programming Interface) plug-in to a Netscape Enterprise Webserver (NES).

Preferably at least once a day, database server 4 sends new user information and updated bone information to sweepstakes system 6 for all new users and all users who have received bones during the course of the day. If required to satisfy local and federal rules and regulations regarding sweepstakes, sweepstakes system 6 may also receive mail-in requests for bones via postcards 13 or other alternative means of sweepstakes entry. Sweepstakes system 6 performs daily, monthly and yearly sweepstakes, with each user getting one entry for each of his or her daily, monthly and yearly bones.

Figure 2:
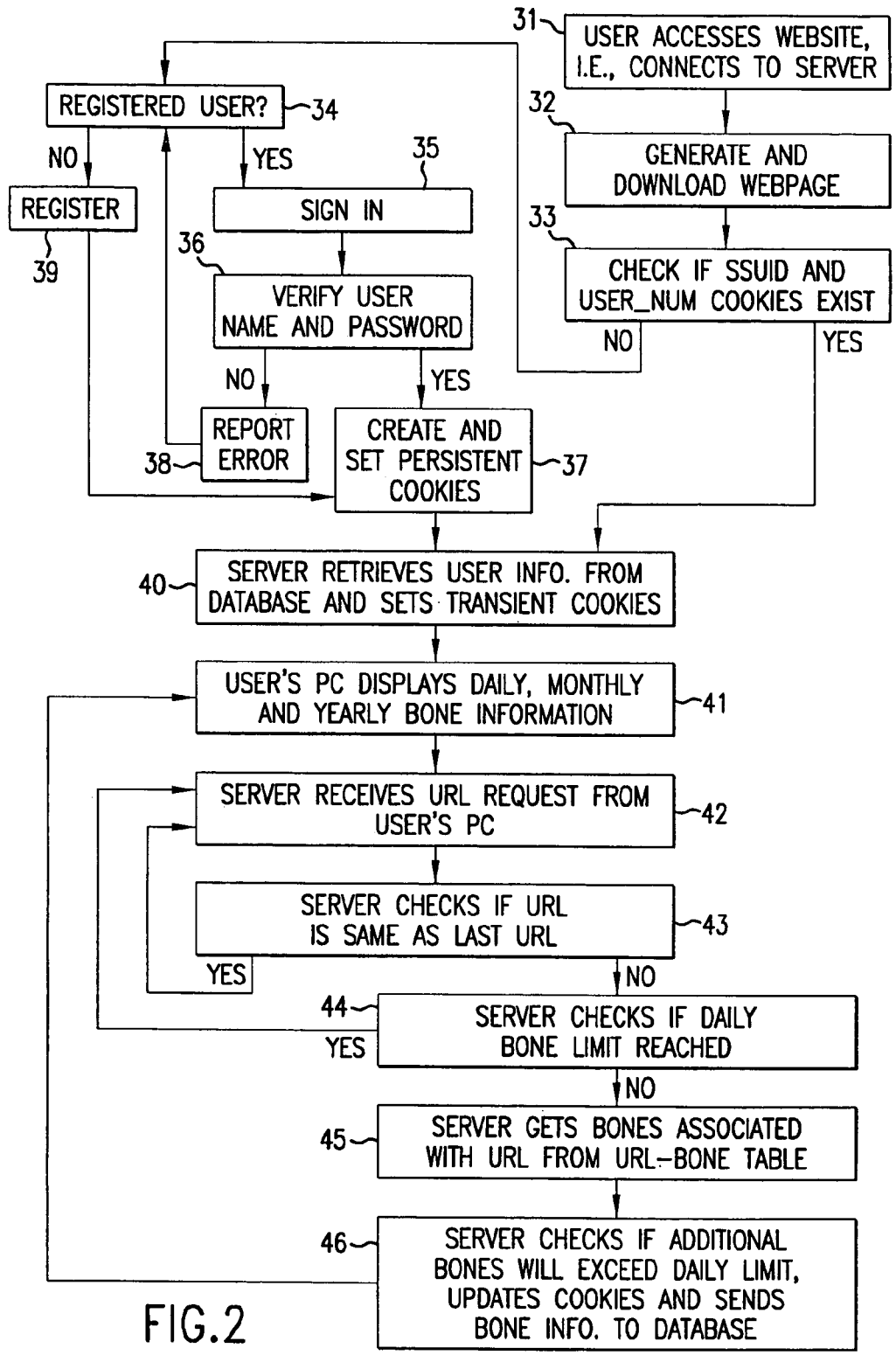
FIG. 2 is a flow chart illustrating a portion of the operation of a preferred embodiment of the present invention.

FIG. 2 is a flowchart illustrating the operation of a preferred embodiment of the present invention. In step 31, a user at PC 1 connects to a web server 3 in host 2 by, for example, typing a url associated with host 2 in browser 7. In step 32, host 2 executes a module that generates a webpage and downloads it to PC 1. In step 33, web server 3 checks if ssuid and user_num cookies exist for the user by requesting these cookies from PC 1. If browser 7 does not have cookies enabled, the user cannot get any bones and PC 1 displays an appropriate error message informing the user that cookies must be enabled. As mentioned above, the ssuid and user_num cookies are persistent cookies stored on PC 1 containing a unique user ID and user number, respectively, for a registered user of the system. If these cookies do not exist, either the user has not yet registered with host system 2 or the cookies were deleted (for example, because there was a fault in PC 1 or the cookies were tampered with). If the user has previously registered, then he signs in at steps 34 and 35 by entering his user name and password. In step 36, web server 3 verifies the user name and password based on the information in password table 13. If the user name and password is verified, web server 3, in step 37, creates and sets the ssuid, user_num and DbIndicator cookies in PC 1. The DbIndicator cookie identifies the database server 4 and user_bones table 5 containing information about the user, which is useful if multiple databases are used. Otherwise, web server 3 causes PC 1 to report a sign-in error to the user, at step 38, and the process returns to step 34.

If the user has not been previously registered, then he registers at step 39. During registration, ID cookie module 10 on web server 3 creates an entry for the user in password table 13 and creates a unique ssuid and user number for the user. Also, BCBT module 11 creates an entry for the user in a specific database server 4 and user_bones table 5. The registration process also collects other information about the user, such as the user's age and address, and determines if the user is eligible to participate in the sweepstakes by, for example, checking if the entered age is greater than or equal to 18 and the entered address is located in a United States state or territory. This information can be carefully verified in the event the user wins a sweepstake. Processing then proceeds to step 37, which again creates and sets the ssuid and DBIndicator cookies on PC 1.

Next, in step 40, web server 3 creates and sets the following transient cookies on PC 1: Bonecounter_daily, Bonecounter_monthly, Bonecounter_yearly, Firstname, Registered_flag and Last_url. Bonecounter_daily, Bonecounter_monthly and Bonecounter_yearly cookies store the current number of daily, monthly and yearly bones, respectively. The Firstname cookie stores the user's first name. The bonecounter and Firstname cookies are retrieved by BCBT module 11 from the user_bones table 5 and database server 4 identified by the previously set DbIndicator cookie. The Registered_flag cookie is set to 'Y' (yes) or 'N' (no) depending on whether the user is registered. The Last_url cookie holds the last url the user went to and is used for fraud detection, as explained below. The Last_url cookie preferably expires after 30 minutes; the other transient cookies expire when, for example, the user logs off the Internet.

In step 41, a javascript running on PC 1 reads the bonecounter and Firstname cookies and displays the user's first name and daily, monthly and yearly bonecounts in a box located, for example, at the top of PC 1's display screen.

In step 42, the user clicks on a hyperlink, causing browser 7 on PC 1 to send a url request to BCBT module 11 on web server 3. Url information may also be sent from a third party host, not part of host system 2, to BCBT module 11. In this way, a user may receive bones for accessing and using websites that are not hosted by host 2. In one implementation, the third party host includes an image tag containing a url associated with host 2 on each webpage for which bones are awarded; when browser 7 renders the third party webpage, it will request the url, which in turn will cause the url to be sent to BCBT module 11 on a web server 3 in host 2. If the user's ssuid and user_num cookies are set, BCBT module 11 then awards the user the appropriate number of bones and returns an image containing the current bonecounts in a bone box, which is then displayed on PC 1. Alternatively, the third party host can display current bonecounts in a bone box via a javascript. In another implementation, the third party host can execute its own version of BCBT module 11 that writes user bonecount information to a file, instead of to database server 4. The file can then be sent periodically from the third party host to database server 4, which in turn will update user_bones table 5.

In step 43, BCBT module 11 compares the received url to the url stored in the Last_url cookie. If the two are the same, the user does not get any bones for the request and processing resumes at step 42. This prevents a user from getting credit for, e.g., hitting the reload button on his browser. Otherwise, if the received url is different from the url in the Last_url cookie, BCBT module 11 checks, in step 44, if the daily bone limit has been reached by reading the Bonecounter_daily cookie. If it has, processing resumes at step 42. If the daily bone limit has not been reached, BCBT module 11, in step 45, looks up the number of bones associated with the url in url-bone table 12 on web server 3. Each entry in url-bone table 12 comprises a url (or pathname) and a number of bones associated with the url. A master url-bone table is stored on database server 4 and is automatically downloaded by each web server 3 whenever a web server starts up. The master url-bone table is also periodically downloaded by each web server, for example, once a month, and, the downloaded url-bone tables are also preferably automatically updated whenever the master url-bone table is updated. A received url is first parsed before the table lookup occurs such that all characters after the rightmost slash in the url are removed.

Finally, in step 46, BCBT module 11 determines, based on the Bonecounter_daily cookie, if adding the associated number of bones to the user's bone totals will exceed the user's daily bone limit. If it does not, BCBT module 11 adds the associated number of bones to the Bonecounter_daily, Bonecounter_monthly and Bonecounter_yearly cookies on PC 1; otherwise, BCBT module 11 only adds enough bones to the three bonecounter cookies to bring the Bonecounter_daily cookie up to the daily limit. The javascript on PC 1, in turn, displays the new bone totals in real-time in the user-bone information box.

BCBT module 11 also sends the bone information to database server 4, which independently updates user_bones table 5. The bone information is sent, in one embodiment, asynchronously to reduce the danger that communications between web servers 3 and database server 4 will cause a bottleneck, slowing down the performance of the overall system. BCBT module 11 sends to database server 4 the total number of bones associated with the url even if it will exceed the user's daily bone limit. Database server 4 then performs its own determination of whether the daily bone limit for the user will be exceeded based on the information in user_bones table 5 and only adds enough bones to bring the user up to the daily limit. This determination is performed in two places, BCBT module 11 in web server 3 and database server 4, to ensure that user_bones table 5 will store the correct number of cookies even if something goes wrong with the cookie values that BCBT module 11 uses for its determination. This prevents a user from fraudulently obtaining bones by modifying his or her cookie values.

Database accesses are performed by a database access module executing on database server 4. This module may be implemented as a pooled connection design in which each web server 3 opens a number (for example, 8) connections to database server 4, with the final link in each connection implemented using, for example, RogueWave libraries, Oracles's Pro*C, OCI and/or Query Cache by Sapient Corporation. The writes to the database can be done using asynchronous or synchronous calls to PL/SQL stored procedures. Preferably, synchronization points are set up in each web server 3 such that only one thread can use any one connection to the database at any given time.

Preferably once a day, during an off-peak time such as the early morning, database server 4 transmits to sweepstakes system 6 new user information and daily bone information for each user who was awarded one or more bones during the previous twenty-four hours. The time that this transmission occurs is referred to as "bone time," and is programmed into BCBT module 11. If a user accesses host system 2 during bone time, BCBT module 11 will place a special token in a cookie that specifies that the bone counting system is unavailable. This cookie is read by the javascript on PC 1, which in turn displays an appropriate message in the user bone-box on PC 1. BCBT module 11 will come out of the bone time state when a flag is set by database server 4 telling BCBT module 11 that bone time is finished.

Sweepstakes system 6 conducts daily, monthly and yearly sweepstakes in accordance with applicable local and federal rules and regulations. Each user automatically gets an entry in each daily, monthly and yearly sweepstakes for each of his or her daily, monthly and yearly bones. Preferably, the awards for each of the sweepstakes is large enough to encourage users to use host system 2. In one embodiment, the daily sweepstake prize is $10,000, the monthly sweepstake prize is $1,000,000, and the yearly sweepstake prize is $10,000,000.

Figure 3A:
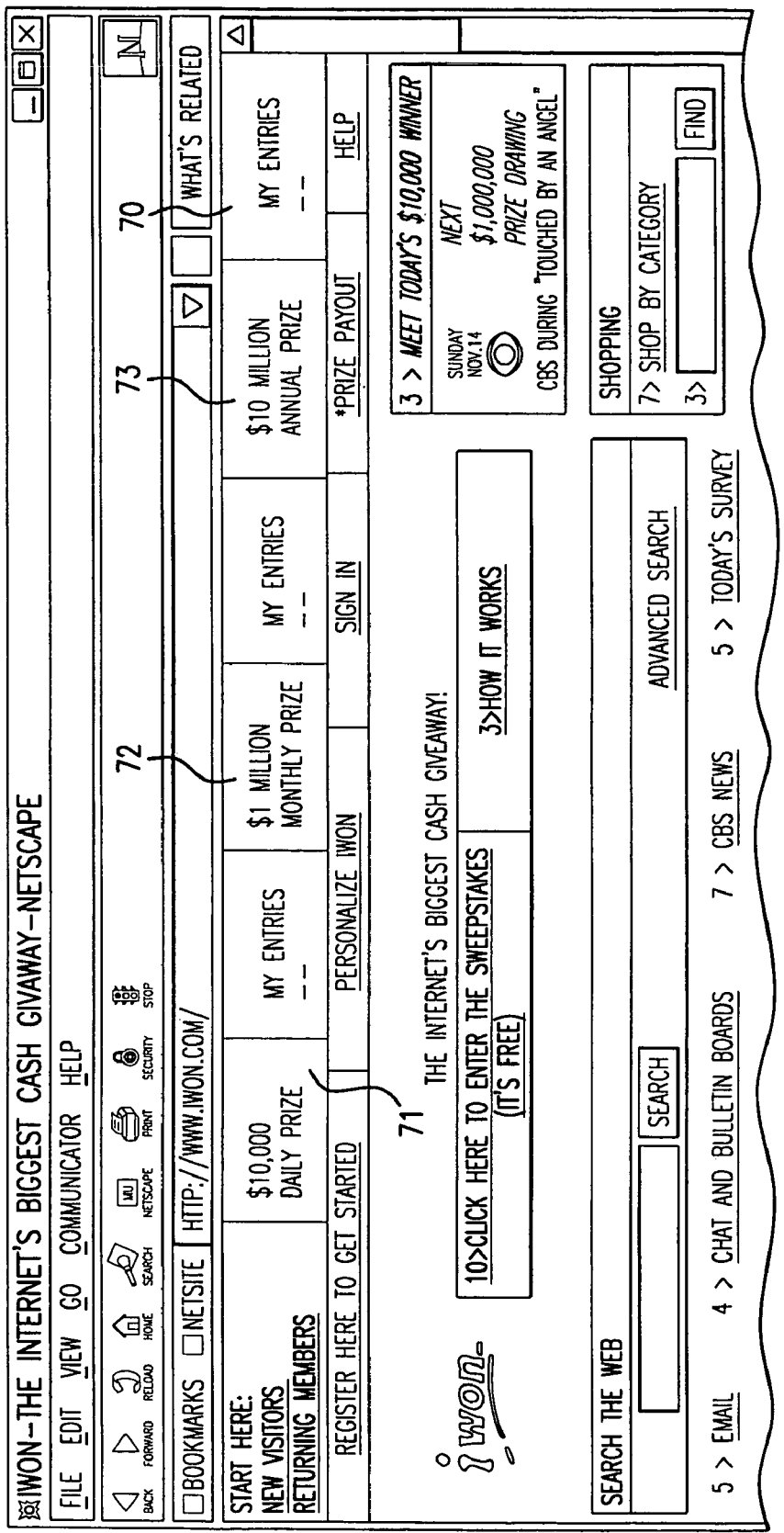
FIG. 3 is a web page in accordance with a preferred embodiment of the present invention.
Figure 3B:
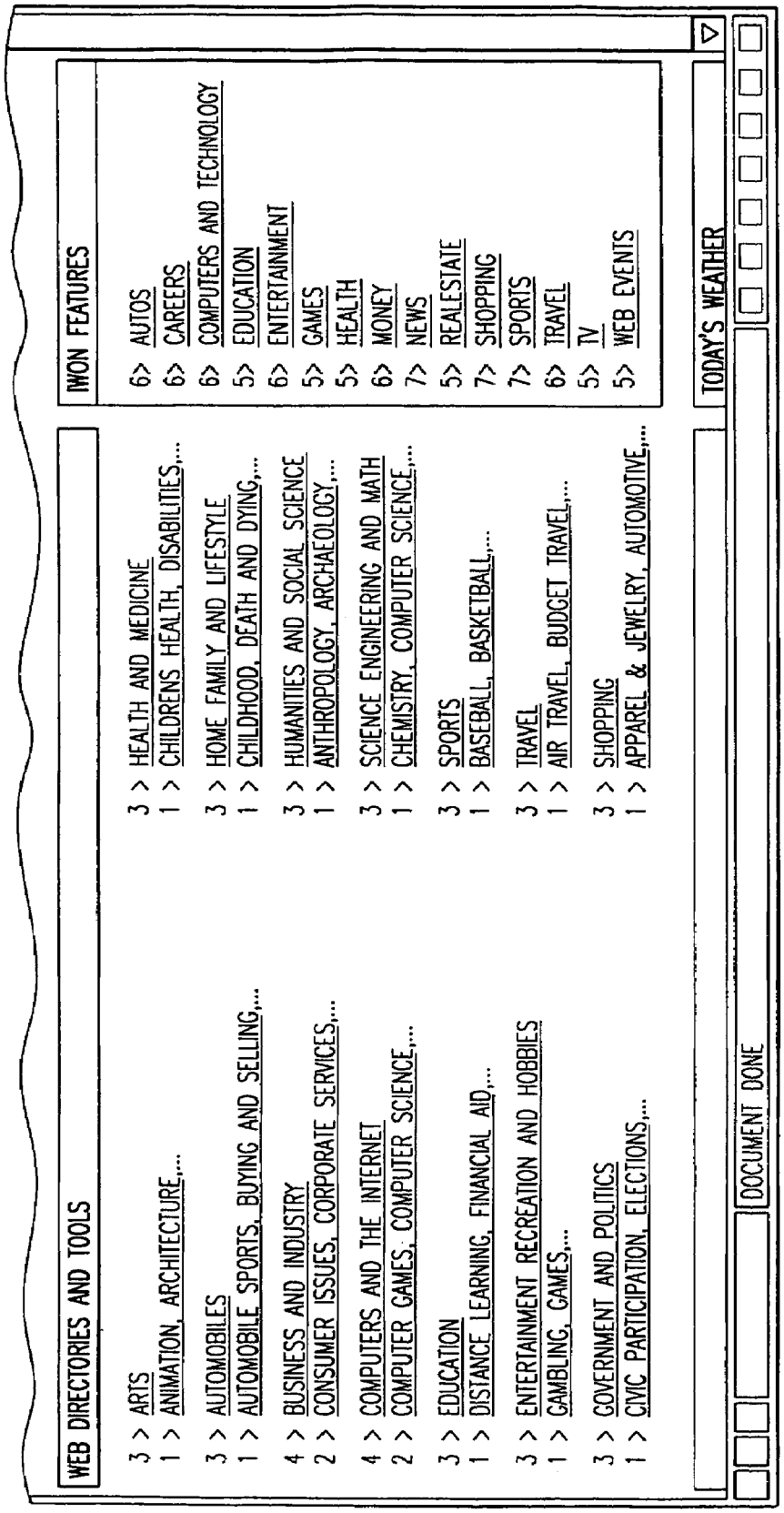

FIG. 3 is a web page in accordance with an embodiment of the present invention. At the top of the page is user bone box 70. Under "Myentries" in the "$10,000 Daily prize" subbox 71, "$1 Million Monthly Prize" subbox 72 and "$10 Million Yearly Prize" subbox 73, the "--" is replaced by the current number of daily, monthly and yearly bones, respectively, once a registered user signs in. In addition, next to each hyperlink, a number appears, indicating the number of bones a user will receive for clicking on the hyperlink.

What is claimed is:

1. A method of entering a user in a sweepstakes comprising:

provding a website for access by a user, the website including a plurality of hyperlinks to services and webpages in the website, and each of the plurality of hyperlinks having an associated point value indicative of any number of points the user can get for clicking on the hyperlink, wherein at least two hyperlinks of the plurality of hyperlinks have different associated point values, the associated point values for the plurality of hyperlinks being stored in look-up table stored in a web server associated with the website;

receiving a request that indicates that the user has clicked on one of the plurality of hyperlinks;

determining a point value associated with the one of the plurality of hyperlinks by looking up the associated point value in the look-up table;

awarding, based on the point value associated with the one of the plurality of hyperlinks, at least one point to the user as a result of the user clicking on the one of the plurality of hyperlinks; and awarding, based on a predetermined number of at least one point awarded to the user for clicking on the one of the plurality of hyperlinks, at least one entry in a sweepstakes.

2. The method of claim 1, further comprising automatically entering the user in the sweepstakes after determining eligibility based on a number of factors including at least one of age and location, and wherein a maximum number of points the user, can accumulate in one day is fixed.

3. The method of claim 1, further comprising:
storing registration information pertaining to the user;
generating a spoof-resistant unique identifier of the user;
writing the spoof-resistant unique identifier in a persistent cookie on a computer of the user; and
using, but the host computer, the persistent cookie to allocate points.

4. The method of claim 1, wherein the user receives one entry in the sweepstakes for each point awarded to the user after a redundant check is performed in both a counting bone tracking module of the host computer and a database server of the host computer, and wherein a transient cookie having last location information is processed to detect fraud.

5. The method of claim 1, wherein the user is awarded one or more points for accessing a feature of the webpage.

6. The method of claim 1, wherein the user is awarded one or more points for making the webpage the user's home page.

7. The method of claim 1, wherein the user is awarded one or more points for signing up for a service offered by a host system.

8. The method of claim 7, wherein the service is email.

9. The method of claim 1, further comprising:
displaying the number of awarded points on a user computer system associated with the user, wherein the displayed number of points is updated substantially concurrently with an award of additional points.

10. The method of claim 1, further comprising:
displaying the number of awarded points on a user computer system associated with the user, wherein the displayed number of points is updated when additional points are awarded.

11. The method of claim 1, further comprising:
storing the table containing, for each hyperlink for which at least one point is awarded, a number of at least one point associated with the hyperlink.

12. The method of claim 11, further comprising:
displaying the number of points associated with the at least one hyperlink on the webpage.

13. The method of claim 1, further comprising:
storing a database on a database server, wherein the database stores point information relating to the user.

14. The method of claim 13, further comprising:
storing a table containing, for each hyperlink on the webpage for which points are awarded, a number of points associated with the hyperlink;
displaying the number of awarded points on a user computer system associated with the user, wherein the displayed number of points is updated substantially concurrently with an award of additional points; and
transmitting the points awarded to the user to the database server at least once a day.

15. The method of claim 14, wherein the points are transmitted to the database server asynchronously to reduce bottlenecks between a web server and the database server.

16. The method of claim 1, further comprising:
allowing the user to connect to a third-party website via a hyperlink on the webpage, wherein said hyperlink is one of said plurality of hyperlinks; and
awarding at least one point to the user for accessing at least one feature of the third party website.

17. The method of claim 1, wherein a point value associated with one of the plurality of hyperlinks is displayed on the webpage in proximity to where the one of the plurality of hyperlinks is displayed on the webpage.

18. The method of claim 1, wherein point values associated with respective hyperlinks in the plurality of hyperlinks are displayed on the webpage in proximity to where their respective hyperlinks in the plurality of hyperlinks are displayed on the webpage.

19. The method of claim 1, wherein the plurality of hyperlinks includes a hyperlink to a third-party webpage and wherein the host computer system awards at least one point to the user for accessing the hyperlink to the third-party webpage.

20. The method of claim 1, further comprising:
storing the table containing, for each hyperlink of the plurality of hyperlinks, a number of at least one point associated with the hyperlink.

21. The system of claim 1, wherein the awarded points are not used to redeem merchandize or prizes.

22. A sweepstakes system, comprising:
a host computer system hosting a website, wherein the website includes a plurality of hyperlinks to services and webpages in the website and each of the plurality of hyperlinks has an associated point value indicating any number of points a user can get for clicking on the hyperlink; and
a look-up table stored in the host computer system, the look-up table storing the associated point values for the plurality of hyperlinks,
wherein at least two hyperlinks of the plurality of hyperlinks have different associated point values;
wherein the host computer system receives a request that indicates that the user has clicked on one of the plurality of hyperlinks;
wherein the host computer system determines a point value associated with the one of the plurality of hyperlinks by looking up the point value in the look-up table;
wherein the host computer system awards at least one point to the user as a result of the user clicking on the one of the plurality of hyperlinks; and
wherein the user is given a number of at least one entry in a sweepstakes based on a predetermined number of points the user has been awarded for clicking on the one of the plurality of hyperlinks.

23. The system of claim 22, wherein the user is automatically entered by the host system in the sweepstakes after determining eligibility based on a number of factors including at least one of age and location, and wherein a maximum number of points the user can accumulate in one day is fixed.

24. The system of claim 22, wherein the host computer system stores registration information pertaining to the user, wherein a spoof-resistant unique identifier of the user is written in a persistent cookie on a computer of the user and is used to allocate points, and wherein a transient cookie having last location information is processed to detect fraud.

25. The system of claim 22, wherein the user receives one entry in the sweepstakes for each point the user has been awarded after a redundant check is performed in both a counting bone tracking module of the host computer and a database server of the host computer.

26. The system of claim 22, wherein the user is awarded one or more points for accessing a feature of the webpage.

27. The system of claim 22, wherein the user is awarded one or more points for making the webpage the user's home page.

28. The system of claim 22, wherein the user is awarded one or more points for signing up for a service offered by the host computer system.

29. The system of claim 28, wherein the service is email.

30. The system of claim 22, wherein the point value associated with at least one of the plurality of hyperlinks is displayed on the webpage.

31. The system of claim 22, wherein the point value for each of the plurality of hyperlinks is displayed on the webpage.

32. The system of claim 22, wherein the host computer system stores the table containing, for each hyperlink on the webpage for which at least one point is awarded, a number of at least one point associated with the hyperlink.

33. The system of claim 22, wherein the number of points awarded to the user is displayed on a user computer system when the user computer system accesses the webpage and the host computer system causes the displayed number of points to be updated substantially concurrently with an award of additional points.

34. The system of claim 22, further comprising a database server storing a database; the database storing point information relating to the user.

35. The system of claim 34, wherein:
the host computer system stores the table containing, for each hyperlink for which points are awarded, a number of at least one point associated with the hyperlink;
the number of awarded points is displayed on a user computer system and the host computer system causes the displayed number of points to be updated after an award of additional points; and
the host computer system transmits the points awarded to the user to the database server at least once a day.

36. The system of claim 35, wherein the points are transmitted to the database server asynchronously to reduce bottlenecks between a web server and the database server.

37. The system of claim 22, further comprising:
a third-party computer system hosting a third-party website, wherein
(i) a user computer system accessing the webpage can be connected to the third-party computer system via one of the plurality of hyperlinks; and
(ii) the host computer system awards at least one point to the user for accessing the one of the plurality of hyperlinks that directs the user to the third-party website.

38. The method of claim 22, further comprising:
connecting the user to a third-party website; and
awarding points to the user for accessing features of the third-party website.

39. The system of claim 22, wherein a point value associated with one of the plurality of hyperlinks is displayed on the webpage in proximity to where the one of the plurality of hyperlinks is displayed on the webpage.

40. The system of claim 22, wherein point values associated with respective hyperlinks in the plurality of hyperlinks are displayed on the webpage in proximity to where their respective hyperlinks in the plurality of hyperlinks are displayed on the webpage.

41. The system of claim 22, wherein the plurality of hyperlinks includes a hyperlink to a third-party webpage and wherein the host computer system awards at least one point to the user for accessing the hyperlink to the third-party webpage.

42. The system of claim 22, wherein the awarded points are not used to redeem merchandize or prizes.

43. Computer code embedded in a storage medium performing:
providing a website for access by a user, the website including a plurality of hyperlinks to services and webpages in the website, and each of the plurality of hyperlinks having an associated point value indicative of any number of points the user can get for clicking on the hyperlink, wherein at least two hyperlinks of the plurality of hyperlinks have different associated point values, the associated point values for the plurality of hyperlinks being stored in look-up table stored in a web server associated with the website;
receiving a request that indicates that the user has clicked on one of the plurality of hyperlinks;
determining a point value associated with the one of the plurality of hyperlinks by looking up the associated point value in the look-up table;
awarding, based on the point value associated with the one of the plurality of hyperlinks, at least one point to the user as a result of the user clicking on the one of the plurality of hyperlinks; and
awarding, based on a predetermined number of at least one point awarded to the user for clicking the one of the plurality of hyperlinks, at least one entry in a sweepstakes.

44. The computer code of claim 43, further performing:
automatically entering the user in the sweepstakes after determining eligibility based on a number of factors including at least one of age and location, and wherein a maximum number of points the user can accumulate in one day is fixed.

45. The computer code of claim 43, further performing:
storing registration information pertaining to the user;
generating a spoof-resistant unique identifier of the user;
writing the spoof-resistant unique identifier in a persistent cookie on a computer of the user; and
using, but the host computer, the persistent cookie to allocate points.

46. The computer code of claim 43, wherein the user receives one entry in the sweepstakes for each point awarded to the user after a redundant check is performed in both a counting bone tracking module of the host computer and a database server of the host computer, and wherein a transient cookie having last location information is processed to detect fraud.

47. The computer code of claim 43, wherein the user is awarded one or more points for accessing a feature of webpage.

48. The computer code of claim 43, wherein the user is awarded one or more points for making the webpage the user's home page.

49. The computer code of claim 43, wherein the user is awarded one or more points for signing up for a service offered by the host system.

50. The computer code of claim 49, wherein the service is email.

51. The computer code of claim 43, further performing:
displaying the number of awarded points, wherein the displayed number of points is updated substantially concurrently with an award of additional points.

52. The computer code of claim 43, further performing:
displaying the number of awarded points on the user computer system, wherein the displayed number of points is automatically updated when additional points are awarded.

53. The computer code of claim 43, further performing:
displaying on the webpage a number of at least one point associated with at least one hyperlink displayed on the webpage.

54. The computer code of claim 53, further performing:
displaying the number of awarded points on the user computer system, wherein the displayed number of points is updated substantially concurrently with an award of additional points.

55. The computer code of claim 43, further performing:
storing a database on a database server, wherein the database stores point information relating to the user.

56. The computer code of claim 55, further performing the steps of:
storing a table containing, for each hyperlink on the webpage for which at least one point is awarded, a number of at least one point associated with the hyperlink;
displaying the number of awarded points on the user computer system, wherein a host computer system causes the displayed number of points to be updated substantially concurrently with an award of additional points; and
transmitting the points awarded to the user to the database server at least once a day.

57. The computer code of claim 56, wherein the points are transmitted to the database server asynchronously to reduce bottlenecks between a web server and the database server.

58. The computer code of claim 56, further performing:
connecting the user computer system to a third-party website; and
awarding points to the user for accessing features of the third-party website.

59. The computer code of claim 43, further performing
connecting the user computer system to a third-party web site; and
awarding points to the user for accessing features of the third-party website.

60. The system of claim 43, wherein the awarded points are not used to redeem merchandize or prizes.

61. A method of entering a user in a sweepstakes comprising:
providing a website for access by a user, the website including a plurality of hyperlinks to services and webpages in the website, and each of the plurality of hyperlinks having an associated point value indicative of any number of points the user can get for clicking on the hyperlink, wherein at least two hyperlinks of the plurality of hyperlinks have different associated point values, the associated point values for the plurality of hyperlinks being stored in look-up table stored in a web server associated with the website;
receiving a request that indicates that the user has clicked on one of the plurality of hyperlinks;
determining a point value associated with the one of the plurality of hyperlinks by looking up the associated point value in the look-up table;
awarding, based on the point value associated with the one of the plurality of hyperlinks, at least one point to the user as a result of the user clicking on the one of the plurality of hyperlinks; and
exchanging automatically a predetermined number of at least one point of the awarded points for at least one entry in a sweepstakes.

* * * * *